Aug. 7, 1956    L. E. ELFES ET AL    2,757,504
TRACTOR MOUNTED MOWER AND LIFTING MEANS THEREFOR
Filed April 7, 1953    4 Sheets-Sheet 2

INVENTORS.
LEE E. ELFES &
LEO J. LORENZ
BY Carlson, Pitzner, Hubbard & Wolfe
ATTORNEYS.

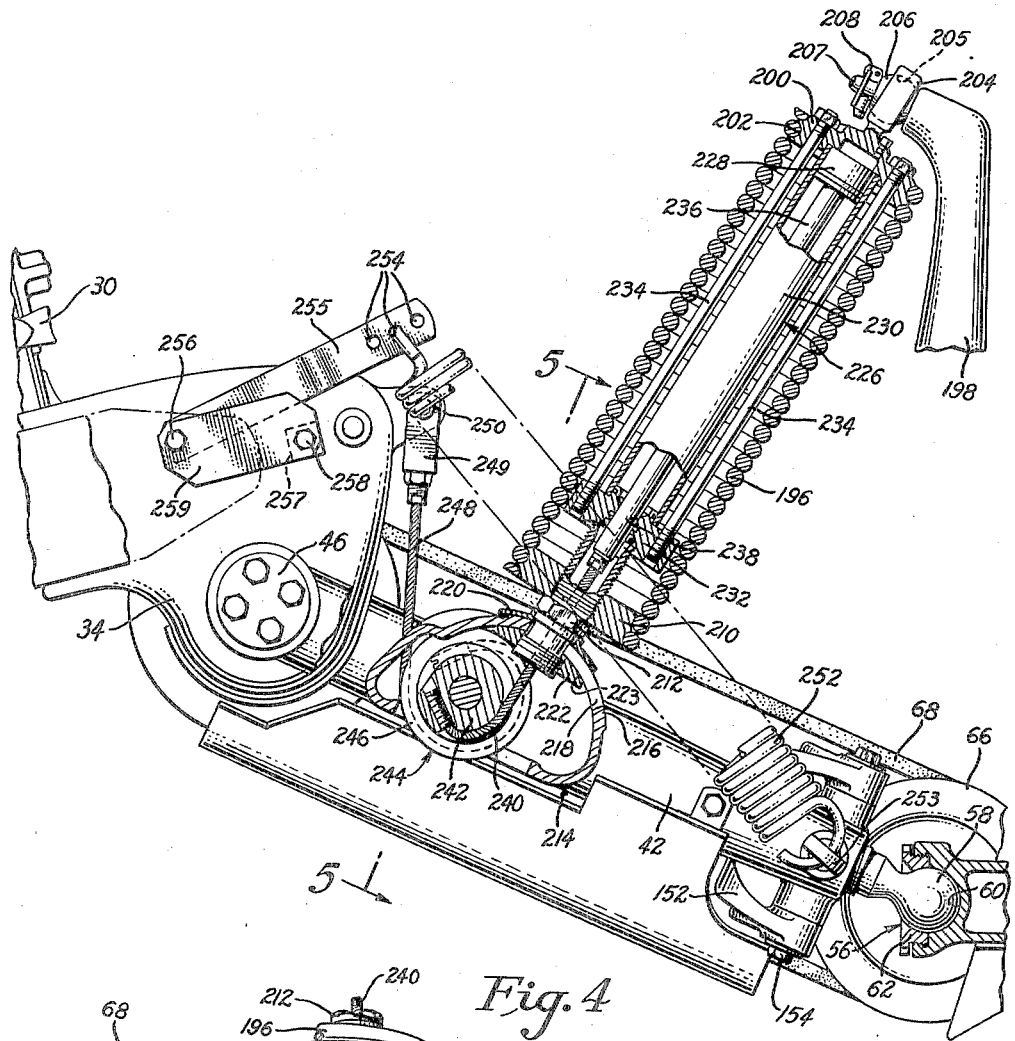
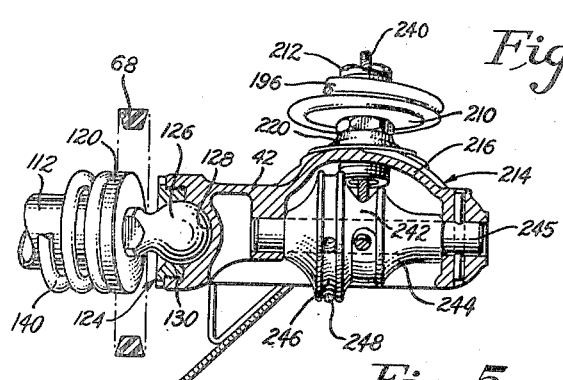

Aug. 7, 1956  L. E. ELFES ET AL  2,757,504
TRACTOR MOUNTED MOWER AND LIFTING MEANS THEREFOR
Filed April 7, 1953  4 Sheets-Sheet 4
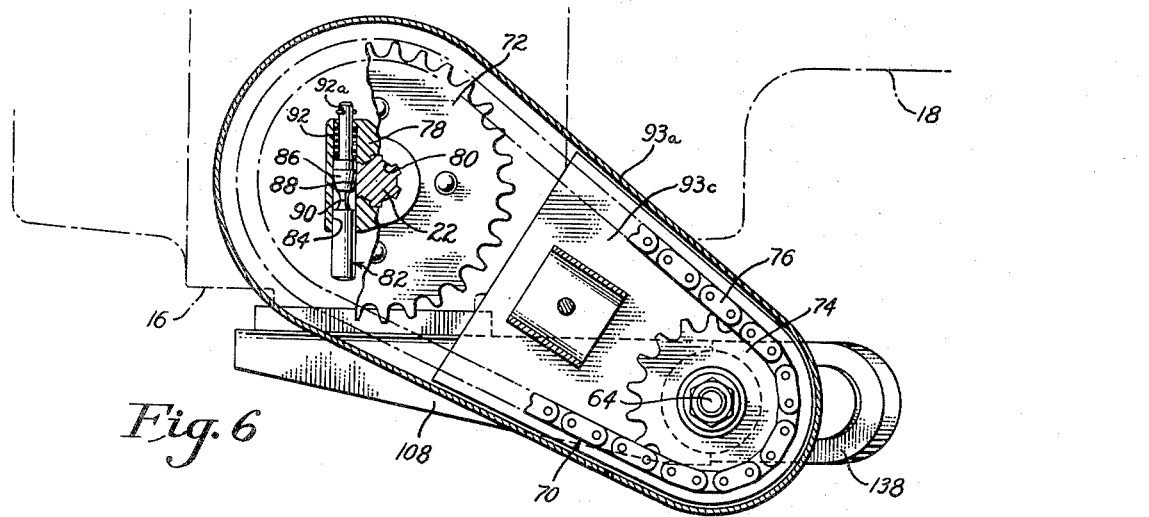
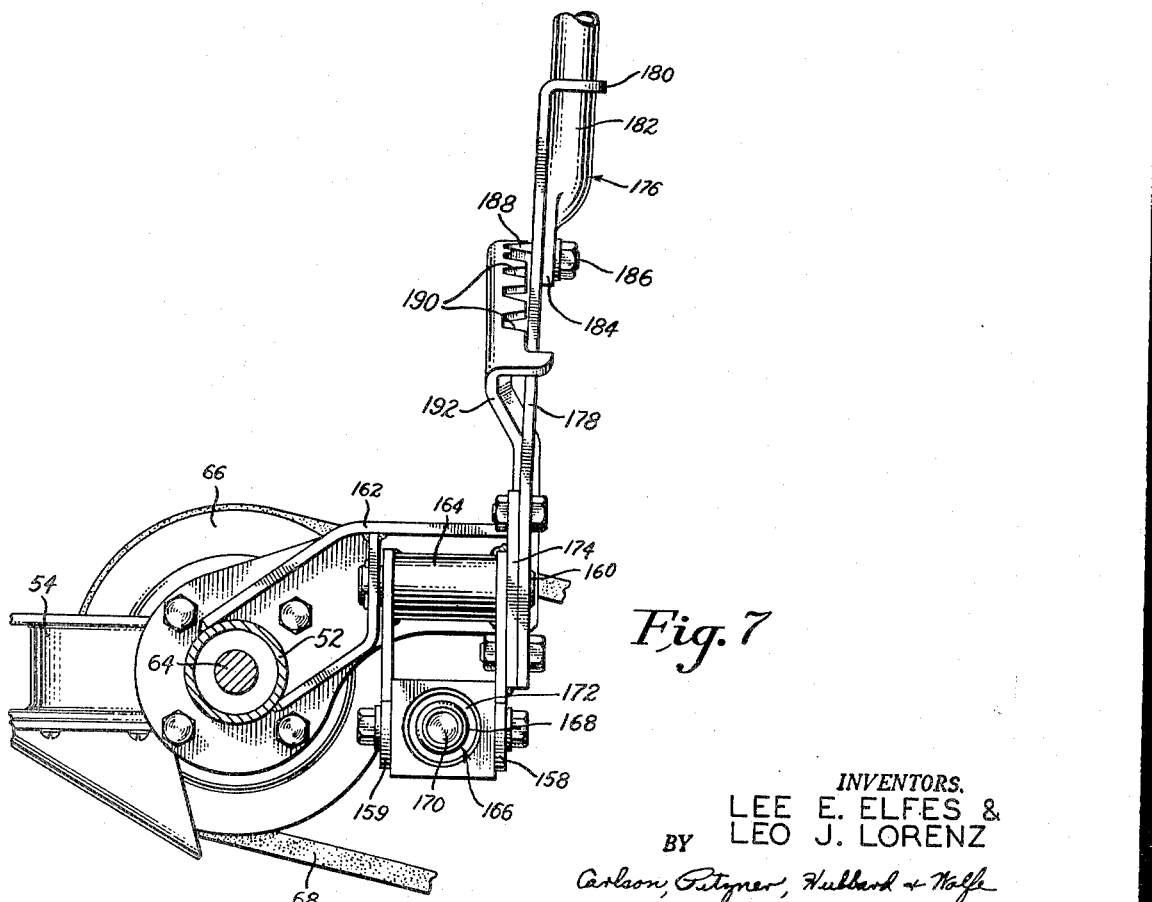
INVENTORS.
LEE E. ELFES &
BY LEO J. LORENZ
Carlson, Pitzner, Hubbard & Wolfe
ATTORNEYS.

United States Patent Office 2,757,504
Patented Aug. 7, 1956

2,757,504

TRACTOR MOUNTED MOWER AND LIFTING MEANS THEREFOR

Lee E. Elfes, Birmingham, and Leo J. Lorenz, Detroit, Mich., assignors to Harry Ferguson, Inc., Detroit, Mich., a corporation of Delaware Application April 7, 1953, Serial No. 347,192

8 Claims. (Cl. 56—25)

This invention relates to mowers and particularly to mowing attachments for tractors or the like.

A general object of the invention is to provide an improved mowing attachment of the type adapted to be mounted on one side of a tractor between the front and rear wheels.

For purposes of orientation in the art the mower herein disclosed may, in general, be considered as an improvement on the side-mounted mower disclosed in an instruction manual entitled "Heavy Duty Mower P-EO-A 21 Operating and Assembly Instructions," published in 1949 by Harry Ferguson, Inc. of Detroit, Michigan.

A further object is to provide a side-mounted mower attachment having an improved lift mechanism for elevating and lowering the cutter bar.

Another object is to provide an improved lift mechanism adapted to act as a curb lift, or in other words, to raise the inner end of the cutter bar for mowing along raised curbs, while permitting the outer end of the cutter bar to follow ground contours.

Another object is to provide a side-mounted mower which is simple in construction, yet strong, durable and efficient in operation.

Further objects and advantages of the invention will appear from the following description, taken with the accompanying drawings in which:

Fig. 4 is a fragmentary elevational view similar to Fig. 2 but showing the mower in an elevated position.

Fig. 5 is a fragmentary sectional view, taken generally along the line 5—5 in Fig. 4, and showing a portion of the lift mechanism.

Fig. 6 is a vertical sectional view of a portion of the driving mechanism for the mower, taken generally along the line 6—6 in Fig. 1.

Fig. 7 is a vertical sectional view taken generally along the line 7—7 in Fig. 1.

Figure 1:
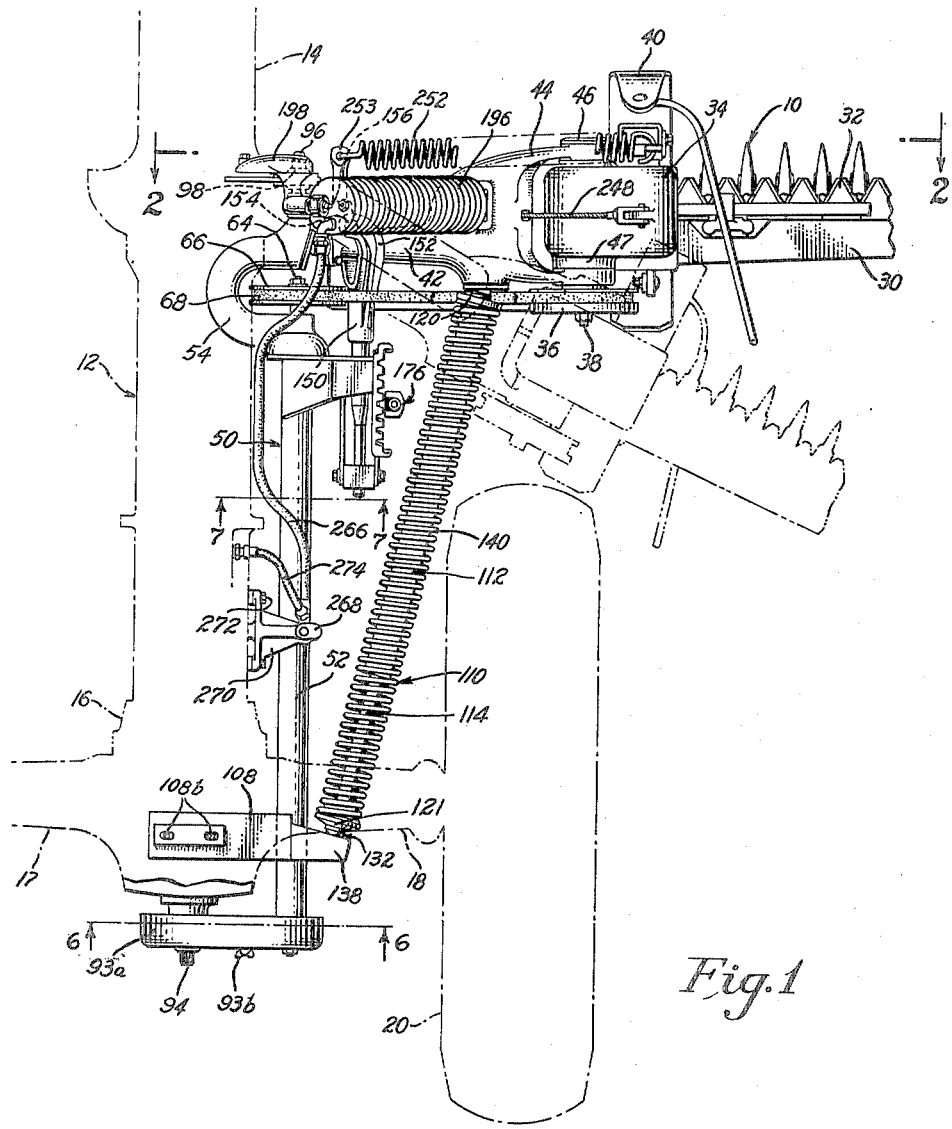
Fig. 1 is a plan view of an illustrative form of mower constructed in accordance with the invention, the mower being shown as side-mounted on a tractor partially indicated in dot-dash outline and the outer portion of the mower bar being broken away in the drawing. The break-back position of the mower is also indicated in dot-dash lines.

While the invention is susceptible of various modifications and alternative constructions, there is shown in the drawings and will herein be described in detail the preferred embodiment, but it is to be understood that it is not thereby intended to limit the invention to the form disclosed, but it is intended to cover all modifications, alternative constructions and equivalents falling within the spirit and scope of the invention as expressed in the appended claims.

Figure 2:
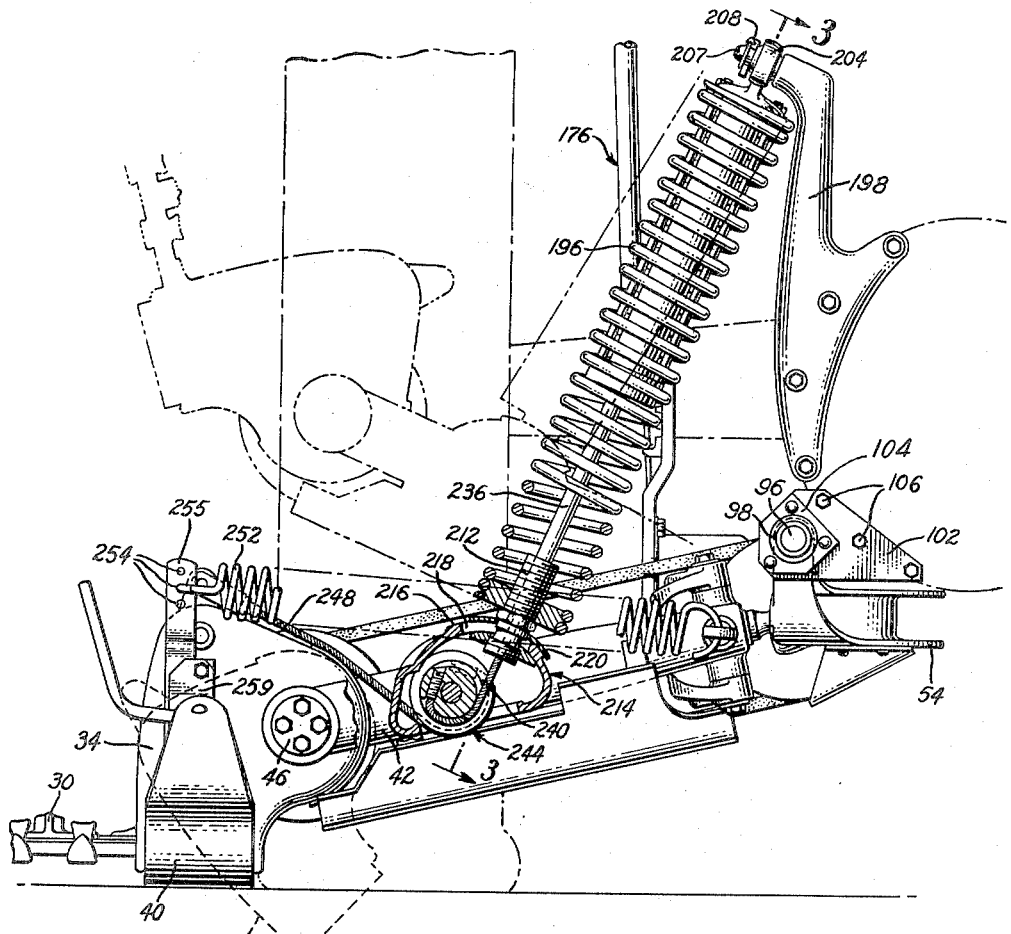
Fig. 2 is a front elevation, on a somewhat enlarged scale, of the mower of Fig. 1, the view being partly in section, generally along the line 2—2 in Fig. 1. Stop-motion positions of the mechanism in raising and downward swinging are indicated in dot-dash lines as well as adjacent portions of the tractor.

Considered more particularly, the illustrative embodiment of the invention, shown generally in Figs. 1 and 2 of the drawings, comprises a mower or mower attachment 10 mounted on the right-hand side of a tractor 12. In this instance the tractor 12 will be recognized by those skilled in the art as a Ferguson, generally as shown in the Ferguson United States Patent No. 2,118,180, but the invention is, of course, applicable to mowers for use with various types of tractors or other tractive vehicles, the Ferguson tractor being selected here simply to explain and illustrate the invention.

Before proceeding with a description of the mower 10 it will be well to outline the basic construction of the tractor 12 on which the mower is mounted. The tractor comprises a narrow body 14, extending fore and aft, and provided at its rear end with a center housing 16 in which is located a differential (not shown). Extending laterally from the center housing is a pair of axle housings 17, 18 which provide support for a pair of rear traction wheels 20, only the right-hand wheel being shown. A splined power take-off shaft 22 (Fig. 6) extends rearwardly from the lower portion of the center housing. Provision is made on the tractor for selectively utilizing the tractor engine (not shown) to drive the shaft 22.

Laterally-spaced Ferguson-type draft links are trailingly pivoted on the differential housing 16 in well known manner. The links may be used to support a rear-mounted implement such as a side-delivery hay rake (not shown), which may be employed in conjunction with the mower, as will appear in greater detail below. To raise and lower the draft links, the tractor is provided with an hydraulically-operated lift mechanism, including a continuously-driven hydraulic pump (not shown) which is controlled by the usual quadrant lever. The latter may be swung upwardly to raise the links and vice versa.

Turning to the mower attachment 10, it will be seen to include a cutter bar 30 (Fig. 1) which extends laterally from the right-hand side of the tractor at a point between the front and rear wheels. The cutter bar comprises a reciprocable cutting knife 32 operable by a driving head 34 which is fixed to the inner end of the cutter bar. The driving head 34 is provided with a drive pulley 36 mounted on a shaft 38 which is disposed in a generally horizontal, fore and aft position. Since the driving head may be conventional, and since, in itself, it comprises no part of the present invention, it will not be shown or described in detail. It will suffice to note that the driving head may comprise a crank or cam-type mechanism adapted to reciprocate the knife 32 in response to rotation of the pulley 36. Mounted on the driving head is a ground shoe 40 of the usual type adapted to ride along the surface of the ground when the mower is in normal operation. It will be understood that the cutter bar 30 is provided with another ground shoe (not shown) at its outer end.

To support the cutter bar 30, the mower 10 is provided with a drag bar 42 having a yoke 44 at its outer end. The driving head 34 is provided with front and rear trunnions 46 and 47 which are pivotally supported by the yoke 44. The pulley shaft 38 extends axially through the rear trunnion 47.

Provision is made for supporting the drag bar 42 and for driving the mower bar 30. To these ends, the mower is provided with a supporting structure 50 which may be mounted in a generally fore and aft position alongside the body 14 of the tractor. The supporting structure comprises an elongated tubular rear member 52 which is fixed to the rear leg of a U-shaped front member 54, the latter being generally channel-shaped in cross-section (Fig. 2). To provide for universal swinging and swiveling movement of the drag bar 42, a ball and socket joint 56 (Fig. 6) is provided between the inner end of the drag bar and the forward leg of the U-shaped member 54. In this instance the joint 56 comprises a ball 58 fixed to the inner end of the drag bar and seated in a spherical socket 60 formed in the U-shaped member 54. A retaining nut 62 is threaded into the U-shaped member to secure the ball in the socket 60.

A drive shaft 64 extends axially through the tubular member 52 and is journaled in suitable bearings supported by the members 52 and 54. Fixed on the front end of the shaft 64 is a pulley 66 which is connected to the pulley 36 on the cutter bar by means of a V-belt 68. The pulley 66 is disposed between the front and rear legs of the U-shaped member 54, the intermediate portion of the latter being offset to provide lateral clearance for the pulley. It should be noted that the ball and socket joint 56 is alined with the drive shaft 64, so that vertical swinging movement of the drag bar will not affect the tension in the belt 68.

A detachable driving connection (see Figs. 1 and 6) is established between the power take-off shaft 22 and the rear end of the drive shaft 64 by means of a chain-type drive 70, comprising sprockets 72 and 74 and an interconnecting roller chain 76, the sprocket 74 being fixed to the rear end of the drive shaft 64. The sprocket 72 may be secured to the power take-off shaft in any suitable manner as, for example, by the simple spring detent shown (Fig. 6). In this set-up the sprocket's hub 78 has a suitably splined bore 80 to receive the power take-off shaft. A locking plunger 82 is slidably disposed in a transverse bore 84 formed in the sprocket hub 78 and has a locking enlargement 86 adapted to interlock with a peripheral notch or groove formed in the power take-off shaft at 88. By depressing the plunger 82 manually, against the bias of a spring 92, which thrusts a pin 92a against the plunger, a reduced portion 90 in the plunger is brought into registration with the groove so that the sprocket can be slipped off the shaft.

The chain 76 is enclosed by a detachable chain guard 93a (Figs. 1 and 6). A wing screw 93b is utilized to secure the guard to a mounting plate 93c, fixed to the tubular member 52.

A splined stub shaft 94 (see Fig. 1) extends rearwardly from the hub 78 of the sprocket 72 so as to provide means for connecting the power take-off shaft 22 to a rear-mounted implement, such as a side-delivery hay rake, which may thus be used in conjunction with the mowing attachment 10.

Provision is made for readily attaching the support 50 to the tractor. For such purpose a forwardly extending pin 96 (Figs. 1 and 2) is fixed to the front leg of the U-shaped member 54. This pin 96 is received in an apertured ball 98 which is supported for free turning movement in a socket formed by an apertured mounting bracket 102 and a pair of retaining plates 104 secured thereto. The bracket 102 may be mounted on the body 14 of the tractor by suitable means, such as bolts 106, which are normally provided in the tractor to join the abutting flanges of the engine and transmission housings.

Fixed on the tubular element 52 of the support 50 (Fig. 1) is a generally horizontal rear-mounting bracket 108 having a plurality of laterally elongated mounting slots 108a, adapted to receive mounting bolts 108b or the like, which may be threaded into the lower side of the center housing 16 on the tractor. By virtue of the slots 108a the mounting bracket 108 may be adjusted laterally, relative to the tractor. In this way proper tension may be obtained in the chain 76. Moreover, the chain may readily be installed or removed if the bolts 108b are loosened and the mounting bracket 108 is moved to the left as far as the slots 108a will permit.

The supporting member 50 may be detached from the tractor merely by removing the chain guard 93a, loosening the bolts 108b, removing the chain 76, detaching the sprocket 72 from the power take-off shaft 22, removing the bolts 108b, and then withdrawing the pin 96 from the apertured ball 98. Installation of the supporting member may be accomplished by inserting the pin 96 into the ball 98 and loosely mounting the bracket 108 on the tractor by means of the bolts 108b, whereupon the sprocket 72 and the chain 76 may be installed. The tension in the chain may be adjusted by suitably positioning the bracket 108, and then the bolts 108b may be tightened.

Provision is made for holding the cutter bar 30 in a laterally extending position during normal operation, while permitting the cutter bar to break or swing back about the ball and socket joint 56 in the event that an obstruction should be encountered. To this end, a spring-loaded compression member 110 (Fig. 1) is connected between the drag bar 42 and the support 50. As illustrated (Fig. 1), the compression member comprises a pair of telescoping members in the form of an elongated tube or cylinder 112 and a rod 114 slidable in guide collars 116 and 117 fixed within the tube. Mounted on the telescoped members 112 and 114 are front and rear plugs 120 and 121, the former being fixed to the cylinder 112 while the latter is threaded on the rear end of the rod 114. The tube 112 is pivotally connected to the drag bar 42 by means of a ball and socket joint 124, comprising a ball 126 fixed to the plug 120 and seated in a socket 128 formed in the drag bar, the ball being retained in the socket by means of a nut 130 (see Fig. 5). Similarly, the rod 114 is pivotally connected to the support 50 by means of a ball and socket joint 132 which comprises a ball 134 fixed to the rearward end of the rod 114 and engaging in a socket formed in a bracket 138, which is fixed to the tubular portion 52 of the support 50 adjacent the rear mounting bracket 108.

Disposed around the telescopically-engaged members 112 and 114 is a compression coil spring 140 having its ends abutting against the plugs 120 and 121. It will be evident that the initial loading of the spring 140 may be adjusted by screwing the plug 121 along the rod 114. Formed on the front end of the rod 114 is an enlarged head 142 engageable with the guide collar 117 to limit the extension of the telescoped members 112 and 114 and thus establish the normal operating position of the drag bar 42.

If an obstruction is encountered which is sufficiently unyieldable to overcome the force of the spring 140, the cutter bar and the drag bar 42 will swing rearwardly, or break back, about the ball and socket joint 56, as shown in dot-dash lines in Fig. 1. To prevent the mower bar from hitting the right-hand rear wheel of the tractor, a stop nut 144 is adjustably threaded on the rod 114 adjacent its rearward end, for engagement with the guide collar 116, so as to limit the compressive movement of the telescopically-engaged members 112 and 114.

The force that is required to initiate break-back of the cutter bar depends entirely upon the initial loading of the spring 140, as determined by the adjustment of the threaded plug 121 along the rod 114. This makes for dependable, consistent operation of the break-back arrangement, since the strength and adjustment of the spring 140 are not subject to variation due to uncontrolled factors such as corrosion, faulty or inadequate lubrication and accumulation of dirt on the working parts. The frictional resistance offered by the spring-loaded compression member 110 is negligible. This is in contrast with conventional latch-type break-back mechanism, in which the interaction of friction surfaces is a vital factor in determining the force required to initiate break-back movement. Rust and other factors of deterioration are likely to cause erratic variations in the calibration of such conventional arrangements.

When an obstruction is encountered by the cutter bar, the spring 140 tends to absorb the shock of the impact. Normally the operator of the tractor will attempt to bring the tractor to a halt as soon as break-back occurs. In the case of the illustrated mower attachment, the spring 140 absorbs a portion of the kinetic energy of the tractor and the cutter bar, as the latter swings rearwardly. In the event that the cutter bar should reach the limit of its rearward travel, as determined by the adjustment of the stop nut 144, before the tractor can be halted, this energy-absorbing action of the spring will substantially reduce the peak loading on the implement. There is no such energy-absorbing action in the case of conventional latch-type break-back arrangements, since the resistance offered by such arrangements drops virtually to zero once break-back has been initiated. Since the spring-loaded break-back member 110 is connected between the drag bar 42 and the rear portion of the support 50, the break-back arrangement requires no special connection to the tractor.

In the illustrated mower, the arrangement is such that the cutting operation of the cutter bar is automatically discontinued when break-back occurs. Since the pivot point of the ball and socket joint 56, on which the drag bar 42 is mounted, is offset forwardly from the drive pulley 66, the drive belt 68 will be loosened as the cutter bar 30 and the drag bar 42 swing rearwardly. This, of course, interrupts the driving connection between the pulleys 66 and 36.

Provision is made in the mower for adjusting the fore and aft tilt of the cutter bar 30. In the illustrated embodiment, this is accomplished by swiveling the drag bar 42 about its own longitudinal axis on the ball and socket joint 56. For this purpose, a rearwardly extending generally horizontal lever 150 (Fig. 1) is mounted on the drag bar 42. To accommodate rearward swinging movement of the drag bar and to make allowance for its slight downward inclination, the lever 150 has a pivotal connection with the drag bar. Thus, the lever is provided with a yoke 152 which is pivoted on the drag bar by means of a bolt 154, extending through a forwardly projecting boss 156 on the drag bar. The bolt is disposed transversely to the respective longitudinal axes of the drag bar 42 and the lever 150.

In order to swing the lever 150 in a generally vertical direction, and thus swivel the drag bar 42 about the ball and socket joint 56, the lever 150 is connected to a pair of links 158 and 159 trailing rearwardly from a pivot 160, the latter being supported in a generally horizontal position by means of a bracket 162 fixed to the support 50 (see Fig. 7). The links 158, 159 are mounted in horizontally spaced relation on the pivot 160 by means of a sleeve 164, to which the links are welded or otherwise fixed. The links 158, 159 are connected to the lever 150 for universal pivoting, swiveling and sliding movement by means of a joint 166 comprising an apertured ball 168 slidably positioned on a cylindrical pin 170 formed at the rearward end of the lever 150. The ball 168 is pivotally carried in a socket assembly 172 secured between the rearward ends of the links 158, 159.

Extending upwardly and welded or otherwise fixed to the link 158 is a stub arm 174 (Fig. 7), to which a hand lever 176 is secured. It will be noted that the hand lever is disposed within easy reach of the driver's seat on the tractor. The hand lever includes a flexible resilient lower member 178 which is bolted at its lower end to the stub arm 174, the member 178 being provided with an outwardly bent, apertured portion 180 at its upper end. Mounted on the flexible member 178 is a relatively rigid tubular member 182 extending through the apertured upper portion 180 of the flexible member 178 and provided with a flattened lower portion 184 which is secured to the member 178 by means of a bolt 186. The latter has a wedge-shaped head 188 engageable with any one of several detent notches 190 formed in a flanged, upright plate 192 fixed to the bracket 162. By pushing the tubular member 182 outwardly, the member 178 may be flexed sufficiently to permit moving the wedge-shaped head 188 from one notch to another.

Swinging the hand lever 176 forward will raise the links 158, 159 and thereby effect upward swinging movement of the lever 150. As a result, the drag bar 42 will be swiveled clockwise (Fig. 7) about the ball and socket joint 56 and the leading edge of the cutter bar will be lowered relative to the trailing edge. When the hand lever is moved rearwardly, the reverse action will take place. Thus, the cutter bar may be tilted downward by swinging the hand lever to its forward limit of travel. On the other hand, an upward tilt of the cutter bar will result from swinging the hand lever to its rearward limit. As the hand lever is swung forward or back, the ball 168 will slide along the pin 170 and will simultaneously be pivoted in the socket assembly 172. At the same time, the lever 150 will experience a slight swinging movement about the pivot bolt 154.

Provision is made for raising and lowering the drag bar 42 and the cutter bar 30, as well as for sustaining or counterbalancing a portion of the weight of these elements, so that the cutter bar will ride more easily along the surface of the ground. For these purposes, a lift mechanism is provided, comprising an extension coil spring 196 (Fig. 2) connected between the drag bar 42 and a bracket 198, shown here as bolted to the tractor body 14 in the same manner as the bracket 102. The upper end of the spring 196 is pivotally secured to the bracket by means of an anchoring disc 200 (Fig. 4) having a helical, peripheral groove 202, into which the upper end of the spring is threaded. Fixed to the disc 200 is an anchoring ring 204 having a spherically curved inner surface 205 which is fitted over an apertured ball 206 adapted to be supported by a stud 207 fixed to the bracket 198. The stud is transversely apertured to receive a pin 208, which is adapted to retain the ball 206 on the stud.

The lower end of the spring 196 is threaded on a helically grooved anchoring disc 210. A bushing 212 is threaded axially through the disc 210. Formed on the drag bar 42 is a casing 214 having an upper wall 216 which is curved in a generally spherical manner. The wall 216 is provided with a generally rectangular slot 218, through which the bushing 212 extends. Fixed to the bushing is a curved flange or collar 220 which slidably engages the outer surface of the wall 216, the flange being of sufficient size to span the slot 218. Within the casing 214, a nut 222 is threaded over the lower end of the bushing 212, the nut being provided with a curved upper surface 223 which slidably engages the inner surface of the wall 216. By means of the flange 220 and the nut 222, the bushing is held captive in the slot 218 but is free to move in the slot as the drag bar is swung or swivelled about the ball and socket joint 56.

To raise and lower the cutter bar 30 and the drag bar 42, the lift mechanism includes a hydraulic ram or actuator 226 (Fig. 4) disposed within the coil spring 196. As illustrated, the actuator 226 comprises a suitably packed piston 228 which is reciprocably disposed within an elongated cylinder 230. The latter is closed at its lower end by means of a cylinder head or plug 232. A pair of threaded tension rods 234 are provided to clamp the cylinder 230 endwise between the cylinder head 232 and the upper spring anchor disc 200, the cylinder head and the disc being apertured to receive the rods. Fixed to the lower end of the piston is a piston rod 236, which extends downwardly through a suitably packed axial bore 238 in the cylinder head. A first tension member, illustrated as a cable 240, is secured to the lower end of the piston rod 236. The piston rod and the cable are disposed for generally axial movement within the bushing 212. At its lower end, the cable 240 is wrapped around one sheave 242 (Fig. 5) of a double pulley 244, which is rotatably mounted in the casing 214 on a pin 245 extending transversely to the longitudinal axis of the drag bar 42. It will be noted from Fig. 4 that the pulley 244 is so located that the point of tangency between the cable 240 and the sheave 242 will be at or near the center of curvature of the spherically curved casing wall 216. In addition to the sheave 242, the pulley 244 comprises a second sheave 246, illustrated as being of somewhat greater diameter than the sheave 242. Wrapped around the sheave 246 is a second tension member or cable 248 which is anchored at one end to the pulley. At its other end, the cable 248 is connected to a clevis 249 which is pivotally secured to an ear 250 on the driving head 34 of the cutter bar 30.

To support a portion of the weight that would otherwise be borne by the outer shoe (not shown) of the cutter bar, so that the cutter bar may be moved more easily along the ground, the mower is provided with a tension spring 252 (Fig. 4), anchored at one end to a forwardly extending anchor post 253 which is mounted on the drag bar 42 adjacent the ball and socket joint 56. The other end of the spring 252 may be hooked into any one of a series of apertures 254 in an arm 255 pivoted to the driving head 34 by means of a bolt 256 or the like. Clockwise swinging movement of the arm 255 is limited by a stop block 257, which is secured to the driving head by means of a bolt 258. The arm 255 is confined laterally between the driving head 34 and a guide plate 259 which is secured to the driving head by the bolts 256 and 258.

The amount of weight sustained by the spring 252 may be adjusted by shifting the spring from one aperture 254 to another along the arm 255, so as to change the turning moment exerted by the spring. When the mower bar 30 is in its normal mowing position on level ground, the spring 252 will be under tension, as shown in Fig. 2, and the arm 255 will thus be drawn against the stop 257. If the mower bar 30 is swung upwardly on its trunnions 46 and 47, the tension in the spring 252 will be relieved, and, in fact, there will be a tendency for compression to develop in the spring. However, the arm 255 will swing away from the stop 257 to relieve such compression, as shown in Fig. 4, so that the spring will not accidentally become disconnected from the arm 255.

Figure 3:
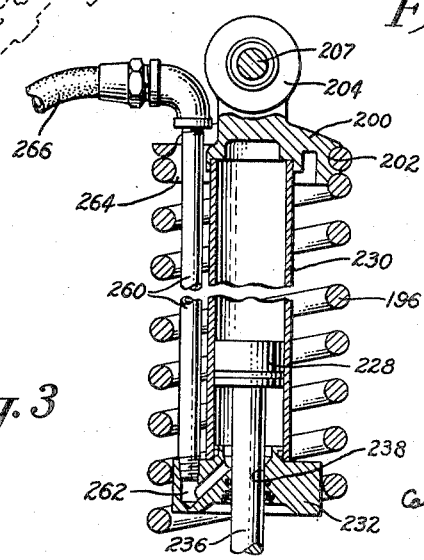
Fig. 3 is a fragmentary sectional view taken along the line 3—3 of Fig. 2 and showing a hydraulic actuator utilized in the lift mechanism for the mower.

Provision is made for utilizing the hydraulic system on the tractor to operate the auxiliary hydraulic ram 226. The arrangement is substantially that described and claimed in Chambers Patent 2,592,393 issued April 8, 1952. In the present instance an inlet pipe 260 (Fig. 3) is connected to the lower end of the cylinder 230, through a passageway 262 in the cylinder head 232. The pipe 260 extends upwardly within the coil spring 196 and passes through an aperture 264 in the upper spring anchor disc 200.

Connected to the upper end of the pipe 260 is a hose 266 which extends to the outlet side of a check valve 268 (Fig. 7). The latter is provided with a mounting bracket 270 which may be secured to the body 14 of the tractor by means of bolts 272 or the like. A hose 274 is utilized to connect the inlet side of the check valve 268 to the outlet side of the hydraulic pump (not shown) on the tractor. When the quadrant lever of the tractor is raised, hydraulic pressure will be developed at the outlet of the hydraulic pump. It will be understood that the check valve 268 will permit hydraulic fluid to flow from the hydraulic pump to the hydraulic ram 226, but ordinarily will prevent reverse flow of the hydraulic fluid. However, the check valve 268 is provided with a release plunger 276, biased upwardly by a spring 278. Depressing the plunger 276 will open the check valve 268 so as to permit reverse flow of hydraulic fluid from the hydraulic ram 226 to the outlet of the hydraulic pump. The check valve 268 is disposed on the tractor with the plunger 276 immediately below the tractor quadrant lever, so that the plunger will be engaged by the quadrant lever when the latter is swung to its lowermost position. In this position of the quadrant lever, the outlet of the hydraulic pump is vented to a reservoir (not shown) as explained in said Chambers patent. It thus will be apparent that the hydraulic ram 226 may likewise be vented by lowering the quadrant lever.

When employed for mowing along level ground, the mower occupies the position shown by the full lines of Fig. 2. Both the inner ground shoe 40 and the outer ground shoe (not shown) rest upon the ground. However, the spring 196 relieves the inner shoe 40 of a portion of the weight that it would otherwise sustain. Likewise, the spring 252 sustains a portion of the weight of the mower bar that would otherwise be borne by the outer ground shoe. In this way a reduction is effected in the ground resistance encountered by the cutter bar, so that the mower may readily be moved along the ground.

In mowing along ground which slopes downwardly away from the right-hand side of the tractor, the cutter bar 30 will droop downwardly on its pivots 46 and 47, as shown in dashed lines in Fig. 2, and both ground shoes will remain in contact with the ground.

With the piston 228 of the hydraulic ram 226 at the lower end of the cylinder 230, there is sufficient slack in the cables 240 and 248 to permit the cutter bar to droop well below the horizontal, so that the mower may be used effectively in mowing the sides of an embankment, with the tractor running along the top of the embankment. Where the ground slopes upwardly away from the side of the tractor, the cutter bar will be swung upwardly on its pivots. It should also be mentioned that the drag bar 42 will swing upwardly and downwardly about the ball and socket joint 56, in order that the inner ground shoe 40 may follow the contours of the ground. The vertical swinging movements of the cutter bar 30 and the drag bar 42 will not affect the drive to the cutter bar, inasmuch as the pulley 36 is coaxial with the pivots 46 and 47, while the pulley 66 is alined with the ball and socket joint 56. Thus the tension in the belt 68 will not be changed by the vertical swinging movement of either the cutter bar or the drag bar.

The hydraulic lifting mechanism on the mower may be utilized to raise the cutter bar 30 and the drag bar 42 so that an obstruction may be cleared, or so that the mower may readily be transported. To elevate the mower, the quadrant lever on the tractor is raised so as to supply hydraulic fluid under pressure to the hydraulic ram 226, as explained above. The pressure of the hydraulic fluid forces the piston 228 upwardly in the cylinder 230 so that tension is exerted on the cable 240. This results in upward swinging movement of the drag bar 42 on the ball and socket joint 56. The inner ground shoe 40 on the cutter bar 30 is thereby raised from the ground, but initially the outer ground shoe remains in contact with the ground. In other words, the cutter bar 30 is not immediately swung upwardly on its pivots 46 and 47. In fact, the upward swinging movement of the drag bar 42 causes a downward droop of the cutter bar relative to the drag bar. However, when the drag bar 42 is elevated to the position shown in Fig. 4, the bushing 212 comes into engagement with the lower end of the cylinder head 232. This arrests the drag bar 42 against further upward swinging movement. As the piston 228 continues to move upwardly in the cylinder 230, the cable 240 rotates the pulley 244 in a counterclockwise direction (Fig. 4). As a result, the cable 248 is reeled onto the sheave 246, and the cutter bar 30 is thereby swung upwardly into the position shown in Fig. 4. This position is also indicated in dot-dash lines in Fig. 2.

When the drag bar 42 and the mower bar 30 have been elevated to the desired position, the operation of the lifting mechanism may be halted by lowering the quadrant lever on the tractor, without, however, depressing the release plunger 276 on the check valve 268.

This operation stops the flow of hydraulic fluid from the pump to the ram 226. The check valve 268 prevents the fluid which is already in the ram from flowing out, so that the mower will remain in its elevated position.

When the mower bar is again to be lowered into engagement with the ground, the quadrant lever is pressed down so as to depress the release plunger 276 on the check valve 268. This opens the check valve so that hydraulic fluid can escape from the cylinder 230 to the sump or reservoir on the tractor. As a result the mower is lowered by its own weight. The check valve 268 restricts the outward flow of the hydraulic fluid from the ram 226 so that the lowering operation is accomplished at a moderate, controlled rate.

In highway mowing, the mower may often be called upon to mow along raised curbs. For this service, the lift mechanism on the mower may be utilized to support the inner end of the cutter bar 30 in an elevated position, so that the cutter bar will clear the curb. In this way, only the outer ground shoe need engage the ground, there being no need for the inner shoe to ride along the curb. When mowing is to be done along a curb, the drag bar and the cutter bar are elevated in the manner just described so that the cutter bar will clear the curb. The tractor is then maneuvered into position on the roadway alongside the curb. To commence mowing, the mower is lowered by moving the quadrant lever downward so as to depress the release plunger 276 on the check valve 268, as just described. The construction of the illustrated mower is such that the cutter bar 30 is lowered first, while the drag bar 42 remains in the elevated position shown in Fig. 4. Thus the outer ground shoe will come into engagement with the ground at a point beyond the curb while the inner end of the cutter bar remains fully elevated above the curb. When the outer ground shoe engages the ground, the tension in the cable 248 is thereby relieved to such an extent that the drag bar 42 will then be lowered, assuming that the release plunger 276 is maintained in its depressed position. When the drag bar has thus been lowered so as to bring the inner end of the cutter bar to the desired elevation above the curb, the quadrant lever is raised sufficiently to permit the plunger 276 to resume its normal position, under the impetus of the spring 278. With the check valve 268 thus closed, the downward movement of the piston 228 in the cylinder 230 is arrested. In consequence, the drag bar will thenceforth be positively supported in the desired position of elevation. As the mowing along the curb proceeds, the cutter bar 30 will be free to swing up and down on the pivots 46 and 47, so that the outer ground shoe will follow the contours of the ground. Downward swinging of the cutter bar will draw out the cable 248 and thereby rotate the pulley 244 in a clockwise direction (Fig. 2). This will wind up the cable 240 on the sheave 242, and the drag bar 42 will thereby be elevated to a certain extent. This action will generally be desirable in mowing the slopes of an embankment adjacent the curb, since the slight raising of the drag bar will tend to prevent an intermediate portion of the cutter bar from engaging the ground. In any case, the elevation of the inner end of the cutter bar may be readjusted by manipulating the quadrant lever. It will be understood that a reverse action will take place when the cutter bar swings upwardly in following ground contours, such movement of the cutter bar being operative to lower the drag bar slightly.

The above described sequence of raising and lowering operations, carried out by the illustrated mower is due to the action of the double pulley 244 and the particular arrangement of the springs 196 and 252. The difference in the diameters of the sheaves 246 and 242 gives the cable 248 a mechanical advantage over the cable 240. When the hydraulic ram exerts a pull on the cable 240 there is a tendency for the pulley 244 to be rotated counterclockwise (Fig. 2) so as to reel in the cable 248 and thereby swing the cutter bar upwardly on its pivots 46 and 47. However, there is also a tendency for the drag bar 42 to be swung upwardly by the pull in the cable 240, acting in cooperation with the tension in the cable 248. Because of the mechanical advantage afforded by the double pulley 244, a greater pull is required on the cable 240 to raise the cutter bar on its pivots than to raise the drag bar on the ball and socket joint 56. As a result, the drag bar is swung upwardly before the cutter bar, the latter being elevated only after the former has reached its limit of elevation. Conversely, the cutter bar is lowered first, and the drag bar is not lowered until the outer ground shoe on the cutter bar engages the ground. This action is highly advantageous in the present mower since it enables the lifting mechanism to function as a curb lift.

Since the spring 196 tends to elevate the drag bar 42, while the spring 252 tends to elevate the mower bar, the arrangement of the springs influences the action of the lifting mechanism. Thus, the sequence of raising and lowering operations described above may more readily be accomplished if the lifting effect of the spring 196 is pronounced, relative to that of the spring 252. The lifting action may be changed by varying the relative lifting effects of the springs 196 and 252. In fact, the cutter bar will be raised ahead of the drag bar if the lifting effect of the spring 252 is made sufficiently pronounced. Moreover, the cutter bar and the drag bar can be made to raise simultaneously by varying the strength and adjustment of the springs 196 and 252. Similar changes in the sequence of lifting and lowering operations may be effected by varying the mechanical advantage provided by the pulley 244. Reducing the mechanical advantage of the sheave 246 over the sheave 242 will tend to result in the cutter bar being raised simultaneously with the drag bar, or even ahead of the drag bar. Further changes in the lifting and lowering action may be effected by making the sheaves 242 and 246 in noncircular, cam shapes so as to control the rates of lifting and lowering movement.

It should be noted that a straight pull is maintained on the spring 196 and the piston rod 236 at all times even though the inclination of these components changes as the drag bar 42 is raised and lowered. At the lower end of the spring, the bushing 212 moves along the slot 218 while the stop nut 222 and the stop collar 220 slide along the inner and outer surfaces of the curved wall 216 of the drag bar. At the upper end of the spring the anchoring ring 204 pivots freely on the ball 206.

In the illustrated mower the tilt-adjusting mechanism and the break-back arrangement are constructed so as to cooperate with the lifting mechanism, any interference with the operation of the lifting mechanism thus being avoided. In the tilt-adjusting mechanism, the pin 170 swivels and slides through the ball 168, to a certain extent, when the drag bar 42 is raised or lowered. Likewise the ball 168 pivots slightly in the socket assembly 172.

Raising or lowering the drag bar 42 changes the angularity of the break-back member 110 relative to the drag bar 42 and the tubular member 52. This change is readily accommodated by the ball and socket joints 124 and 132 at the opposite ends of the break-back member.

In the illustrated mower, the lifting arrangement and the tilt-adjusting mechanism cooperate with the break-back mechanism so that break back may occur without any interference. When the cutter bar swings rearwardly, upon encountering a fixed obstruction, the spring-anchoring ring 204 pivots about the anchoring post 207 on the lift mechanism. Likewise, the bushing 212 moves in the slot 218, while the stop members 220 and 222 slide along the outer and inner surfaces of the curved wall 216. In this way a straight pull is maintained on the spring 196 and the piston rod 236.

In the tilt-adjusting mechanism, rearward movement of the cutter bar results in rearward sliding movement of the pin 170 through the ball 168. At the same time there is relative swinging movement of the yoke 152 and the drag bar 42 about the pivot bolt 154 as well as relative swinging movement of the lever 150 and the links 158 and 159 about the ball and socket joint 166.

The lift mechanism and the break-back mechanism are constructed to accommodate the operation of the tilt-adjusting mechanism. When the drag bar 42 is swivelled on the ball and socket joint 56 to effect a change in the tilt of the cutter bar, the spring-anchoring bushing 212 moves along the slot 213, and the spring-anchoring ring 204 swivels relative to the anchoring post 207, in order to maintain the opposite ends of the spring 196 in alinement. The ball and socket joints 124 and 132 permit the drag bar 42 to swivel without interference from the break-back member 110.

Résumé of operation

While the operation of the illustrative mower will undoubtedly be clear from the foregoing description, it may be helpful to summarize the operation briefly. It is a simple matter to attach the mower to the tractor when mowing is to be done. First of all, the front mounting bracket 102 is bolted to the tractor and the pin 96, at the front end of the support 50, is inserted in the ball 98 carried by that bracket. Next, the rear-mounting bracket 108 is secured loosely on the bolts 108b. The sprocket 72 may then be attached to the power take-off shaft 22, whereupon the chain 76 is looped around the sprockets 72 and 74. Proper tension may be obtained in the chain by adjusting the mounting bracket 108 laterally on the bolts 108b, and then the latter may be tightened down to secure the support 50 to the tractor. To complete the operation of attaching the mower to the tractor, the anchoring bracket 198 is bolted onto the tractor and the apertured ball 206 is slipped over the stud 207 on the bracket, the removable pin 208 being utilized to secure the ball on the stud. Finally, the hydraulic check valve 268 is mounted on the tractor and the hoses 266 and 274 are connected to the inlet of the hydraulic ram 226 and the outlet of the hydraulic pump on the tractor, respectively.

It will be appreciated that the mower may be detached from the tractor by a procedure which is the reverse of the attaching procedure just described. It should be noted, however, that the front-mounting bracket 102 and the anchoring bracket 198 may be left in place permanently on the tractor without interfering with its normal operation. In most cases, the check valve 268 may also be left on the tractor, provided that the hydraulic hoses are disconnected and replaced with suitable plugs.

The mower is put into operation by starting up the tractor and engaging the power take-off mechanism. Through the medium of the sprockets 72 and 74 and the chain 76, the power take-off shaft 22 drives the shaft 64 on the mower. By means of the pulleys 36 and 66 and the belt 68, the shaft 64 operates the driving head 34 on the cutter bar 30, and the cutting knife 32 is thereby reciprocated.

To accommodate various mowing conditions, it may be desirable to change the fore and aft tilt of the cutter bar 30. This is done by swinging the tilt-adjusting hand lever 176 in a fore and aft direction. In order to thus move the lever, it must first be moved laterally to disengage the wedge-shaped detent member 188 from the notched member 192. Moving the lever 176 forwardly will raise the links 158, 159 and the lever 150, so as to swivel the drag bar 42 clockwise (Fig. 7) on the ball and socket joint 56, and thereby tilt the front of the cutter bar downwardly. It will be appreciated that rearward movement of the pitch-adjusting lever 176 will have the reverse effect.

If the cutter bar encounters a fixed obstruction, such as a stump or a rock, during the mowing operation, the cutter bar 30 and the drag bar 42 will be swung rearwardly about the ball and socket joint 56, toward the position shown in dot-dash lines in Fig. 1. This action affords an opportunity for the operator to stop the tractor before any damage is done to the mower. Such rearward movement is resisted only by the spring-loaded break-back member 110, which, however, normally holds the cutter bar in a laterally extending position with sufficient force to prevent break-back due to the load normally imposed on the cutter bar during ordinary mowing operations. Break-back automatically stops the operation of the cutting knife 32 by moving the pulley 36 into closer than normal proximity to the pulley 66, and thus loosening the drive belt 68.

During normal mowing operations, there is sufficient slack in the cables 240 and 248 to permit the drag bar 42 and the mower bar 30 to swing vertically so that the inner ground shoe 40 and the outer ground shoe (not shown) on the cutter bar may follow varying ground contours. In mowing along downward or upward slopes, the cutter bar 30 will droop considerably below or swing considerably above its normal horizontal position. This will not affect the drive to the cutter bar inasmuch as the pulley 36 is coaxial with the pivots 46 and 47 while the pulley 66 is alined with the ball and socket joint 56.

The cutter bar 30 and the drag bar 42 may be elevated to their transport positions by raising the tractor quadrant lever so as to supply hydraulic fluid to the ram 226. Because of the lifting effect of the springs 196 and 252 and the mechanical advantage afforded by the double pulley 244, the drag bar 42 is normally raised first. After the drag bar has been fully elevated, the cable 248 is reeled in by the pulley 244 and the cutter bar 30 is thereby swung upwardly toward the position shown in dot-dash lines in Fig. 2.

To lower the mower into operating position, the quadrant lever is pushed down so as to depress the release plunger 276 and thereby to vent the hydraulic ram 226. this allows the cutter bar to swing downwardly by its own weight, until the outer ground shoe engages the ground, whereupon the drag bar swings downwardly. For curb mowing, the drag bar may be held in a partly elevated position by retaining hydraulic fluid in the ram 226. For such service the outer ground shoe on the cutter bar rides along the ground while the inner end of the cutter bar is supported by the cable 240.

A rear-mounted implement may be used along with the side-mounted mower. Such implement is mounted on the draft links of the tractor in the conventional manner and power for driving it may be obtained by making a connection to the splined stub shaft 94 on the sprocket 72. Since less hydraulic pressure will be required to elevate the mower than to raise the draft links and the implement mounted on the links, the mower may be raised and lowered without affecting the position of the implement. After the mower has been elevated, the implement may be lifted by leaving the quadrant lever up until the requisite hydraulic pressure develops.

We claim as our invention:

1. In a mower attachment for a tractor or the like, the combination comprising a drag bar, a coupling element mountable on the tractor cooperating with a coupling element at one end of the drag bar for pivotally mounting the drag bar in a laterally extending position on one side of the tractor for vertical swinging movement, a cutter bar pivotally connected to the outer end of the drag bar for vertical swinging movement thereon, a pulley rotatably mounted on the drag bar and having a pair of sheaves, one of said sheaves being larger in diameter than the other, lift mechanism mountable on the tractor, a tension element wrapped around and extending upwardly from the smaller of said sheaves to said lift mechanism operable for swinging the drag bar upwardly when tension is applied to said element, stop means on said lift mechanism engageable by said drag bar for arresting the upward movement of the drag bar, said tension element acting to rotate said sheaves when the upward movement of the drag bar is arrested and means including a second tension element extending from the larger of said sheaves to the cutter bar operative to swing the cutter bar upwardly relative to the drag bar in response to the rotation of the sheaves, whereby the drag bar may be raised for mowing along raised curbs.

2. In a mower attachment for a tractor or the like, the combination comprising a drag bar, means for mounting the drag bar in a laterally extending position on one side of the tractor for vertical swinging movement, a cutter bar pivotally connected to the outer end of the drag bar for vertical swinging movement thereon, a pulley rotatably mounted on the drag bar and having a pair of sheaves, one of said sheaves being larger in diameter than the other, a first tension member wrapped around and extending upwardly from the smaller of said sheaves, power operated lift mechanism mountable on the tractor and operative for drawing in and paying out the first tension member for respectively raising and lowering the drag bar, said lift means being further operative to rotate the sheaves after the drag bar is raised to a predetermined position and a second tension member extending from the larger of the sheaves to the cutter bar operative to raise the latter upon rotation of the sheaves, the pulley affording a mechanical advantage so that the cutter bar will be elevated only after the drag bar has been elevated, whereby the drag bar may be raised for mowing along raised curbs.

3. In a mower attachment for a tractor or the like, the combination comprising a drag bar, means for pivotally mounting the drag bar on one side of the tractor in a laterally extending position for vertical swinging movement, a mower bar pivotally connected to the outer end of the drag bar for vertical swinging movement thereon, a pulley rotatably mounted on the drag bar and having a pair of sheaves, a first tension element wrapped around and extending upwardly from one of the sheaves, a second tension element extending from the other of the sheaves to the cutter bar, power operated lift mechanism mountable on the tractor for drawing in and paying out on the first tension element for elevating and lowering the drag bar and the cutter bar and for rotating said pulley to wind the second tension element on the other of said sheaves, said sheaves being of different diameters so that the cutter bar and the drag bar will be raised and lowered in a predetermined sequence.

4. In a mower attachment for a tractor or the like, the combination comprising a drag bar, means for pivotally mounting the drag bar in a laterally extending position on one side of the tractor for vertical swinging movement, a cutter bar pivotally connected to the outer end of the drag bar for vertical swinging movement thereon, power operated lift mechanism mountable on the tractor, a tension element connecting said mechanism with said drag bar for raising the drag bar, cooperating stop means on the drag bar and said mechanism operative to arrest the upward movement of the drag bar at an upper limit position, and a second tension element connected to the cutter bar and operable by the lift mechanism to raise the cutter bar when the drag bar is arrested by the second mentioned means.

5. In a mower attachment for a tractor or the like, the combination comprising a drag bar, a coupling element mountable on the tractor cooperating with a coupling element at one end of the drag bar pivotally mounting the drag bar in a laterally extending position on one side of the tractor for vertical swinging movement, a cutter bar pivotally connected to the outer end of the drag bar for vertical swinging movement thereon, a first spring interposed between the tractor and the drag bar tending to swing the drag bar upwardly, a second spring interposed between the drag bar and the cutter bar tending to swing the cutter bar upwardly relative to the drag bar, lift mechanism mounted on the tractor, a tension element connecting said mechanism with said drag bar to adapt the mechanism to act in cooperation with the first spring for swinging the drag bar upwardly, cooperating stop means on the drag bar and said mechanism for arresting the upward movement of the drag bar, and means including a second tension element connected to said cutter bar and operable by the lift mechanism when the drag bar is arrested by the stop means to act in cooperation with the second spring for swinging the cutter bar upwardly relative to the drag bar.

6. In a mower attachment for a tractor or the like, the combination comprising a supporting member, means detachably mounting the member on one side of the tractor, a laterally extending drag bar pivoted on the supporting member for vertical swinging movement, a cutter bar pivotally connected to the outer end of the drag bar for vertical swinging movement, an extension coil spring having its lower end connected to the drag bar, means for connecting the upper end of the coil spring to the tractor so that the spring will tend to raise the drag bar, a hydraulic ram mounted within the spring, a second spring connected between the drag bar and the cutter bar and tending to raise the latter, a double pulley journaled on the drag bar and having a pair of rigidly interconnected sheaves of different diameters, a first tension member having one end anchored to and the adjacent portion wound around the smaller of said sheaves, means connecting the other end of said first tension member to said ram to condition the ram for raising the drag bar, means for arresting upward movement of the drag bar by said ram, a second flexible tension member having one end anchored to and the adjacent portion wound around the larger of said sheaves, and means including a lever connecting the other end of said second tension member to the cutter bar to adapt said ram for raising the cutter bar after the drag bar has been fully raised.

7. In a mower attachment for a tractor or the like, the combination comprising a drag bar, means pivotally mounting the drag bar in a laterally extending position on one side of the tractor for swinging movement in a vertical plane between upper and lower limit portions, a laterally extending cutter bar pivoted on the outer end of the drag bar for vertical swinging movement, a pair of springs tending respectively to raise the drag bar and the cutter bar, a double pulley journaled on the drag bar and having a pair of rigidly interconnected sheaves of different diameters, an hydraulic ram having a pair of relatively movable elements, means for anchoring one of said ram elements to the tractor, a first tension member connected at opposite ends to the smaller of said sheaves and to the other of said ram elements and having a portion wound around the smaller sheave, and a second tension member connected at opposite ends to the larger of said sheaves and to the cutter bar and having a portion wound around the larger sheave, said sheaves being dimensioned to condition said ram for initially raising said drag bar and then raising the cutter bar after the drag bar has been raised to its upper limit position.

8. In a mower attachment for a tractor, the combination comprising a laterally extending drag bar, means pivotally mounting the drag bar in a laterally extending position on one side of the tractor for swinging movement in a vertical plane between upper and lower limit positions, a cutter bar connected to the outer end of the drag bar for vertical swinging movement, a coil spring, a ball and socket connector for attaching the upper end of the spring to the tractor, a tubular member connected to the lower end of the spring, a pulley journaled on the drag bar, an hydraulic ram including cylinder and piston elements disposed axially within the spring, one of said ram elements being anchored to the ball and socket connector in common with the spring, a flexible tension member wrapped around said pulley and connected at opposite ends to the pulley and to the ram, said tension member extending through the tubular member, means operatively connecting the pulley to the cutter bar, a housing on the drag bar having an arcuate wall centered generally upon the point of tangency between the flexible tension member and said pulley, said wall being formed with a slot for receiving the tubular member, and means for slidably retaining the tubular member in the slot to effectively connect said coil spring to the drag bar.

References Cited in the file of this patent

UNITED STATES PATENTS

| | | |
|---|---|---|
| 1,475,206 | Trolley | Nov. 27, 1923 |
| 1,627,711 | Pearson | May 10, 1927 |
| 1,855,838 | Kranick | Apr. 26, 1932 |
| 1,973,993 | Pearson | Sept. 18, 1934 |
| 2,130,795 | Gollnick | Sept. 20, 1938 |
| 2,204,335 | Wagner | June 11, 1940 |
| 2,314,216 | Hilblom | Mar. 16, 1943 |
| 2,328,838 | Oberlink | Sept. 7, 1943 |
| 2,329,881 | Clapper | Sept. 21, 1943 |
| 2,502,805 | Spurlin | Apr. 4, 1950 |
| 2,504,686 | Hilblom | Apr. 18, 1950 |
| 2,568,931 | Paul | Sept. 25, 1951 |
| 2,617,242 | Iverson | Nov. 11, 1952 |